United States Patent [19]
Smith et al.

[11] Patent Number: 6,030,558
[45] Date of Patent: Feb. 29, 2000

[54] SINTERED POROUS PLASTIC PRODUCTS AND METHOD OF MAKING SAME

[75] Inventors: Michael W. Smith, Sharpsburg; Daniel G. Fullerton, Atlanta, both of Ga.

[73] Assignee: Porex Technologies Corp., Fairburn, Ga.

[21] Appl. No.: 09/064,786

[22] Filed: Apr. 23, 1998

Related U.S. Application Data

[60] Provisional application No. 60/044,238, Apr. 24, 1997.

[51] Int. Cl.[7] .................................................. B29C 35/02
[52] U.S. Cl. ........................... 264/41; 264/115; 264/126; 264/142
[58] Field of Search .............................. 264/41, 115, 126, 264/142

[56] References Cited

U.S. PATENT DOCUMENTS

| | | | |
|---|---|---|---|
| 2,819,209 | 1/1958 | Pall et al. ................................. | 210/510 |
| 2,981,979 | 5/1961 | Seefluth . | |
| 3,022,542 | 2/1962 | Davis . | |
| 3,024,208 | 3/1962 | Goethel et al. . | |
| 3,048,537 | 8/1962 | Pall et al. ................................. | 210/510 |
| 3,051,993 | 9/1962 | Goldman et al. . | |
| 3,336,244 | 8/1967 | Rockoff . | |
| 3,438,912 | 4/1969 | Tsukamoto et al. . | |
| 3,455,483 | 7/1969 | Inklaar . | |
| 3,642,970 | 2/1972 | Hagitani et al. ........................ | 264/122 |
| 3,942,903 | 3/1976 | Dickey et al. ........................... | 401/198 |
| 4,031,179 | 6/1977 | Tatzel et al. . | |
| 4,385,016 | 5/1983 | Gwinn ....................................... | 264/37 |
| 4,460,530 | 7/1984 | Hanson et al. ........................... | 264/121 |
| 4,461,737 | 7/1984 | Voss ......................................... | 264/142 |
| 4,470,791 | 9/1984 | Tanaka et al. ........................... | 425/311 |
| 4,735,626 | 4/1988 | Smith . | |
| 4,870,116 | 9/1989 | Wolbrom .................................. | 521/143 |
| 5,080,847 | 1/1992 | Hazeyama ................................ | 264/112 |
| 5,453,234 | 9/1995 | Gusik ....................................... | 264/120 |
| 5,494,629 | 2/1996 | Gorden et al. ........................... | 264/126 |
| 5,651,931 | 7/1997 | Bailey et al. ............................. | 264/126 |
| 5,811,164 | 9/1998 | Mitchell ................................... | 264/41 |

OTHER PUBLICATIONS

"Mastering Micropellets: A Processing Primer", M. Knights *Plastic Technology*, Jul. 1995, pp. 19–2.

"Pelletizers and Dicers/Equipment Makers Emphasize Higher Quality and Productivity", C. M. Bess *Modern Plastics*, Mid–Nov. 1995, pp. E–32–E33.

"Polyetheylene/Markets Expanding Very Rapidly and Technology Growing at Unequalled Rate", J. MacAdams, *Modern Plastics*, Mid–Nov. 1995, pp. B–3–B–5.

*Primary Examiner*—Mary Lynn Theisen
*Attorney, Agent, or Firm*—Lane, Aitken & McCann

[57] ABSTRACT

Porous products of thermoplastic polymers and the like are formed by sintering pellets, especially micropellets and/or pellets made by rapid water quenched pelletizing of the polymers, such as by underwater pelletizing or water ring pelletizing. The pellets are of a uniform size and shape, each having approximately equal dimensions along three mutually perpendicular axes, thereby producing porous products having smooth surfaces, narrow pore size distributions, greater strength and other improved characteristics. The porous products include antiperspirant and deodorant applicator heads, wastewater treatment bubblers and selective filters.

5 Claims, 2 Drawing Sheets

SINTERED POROUS PLASTIC PRODUCTS AND METHOD OF MAKING SAME

This application claims benefit of provisional application Ser. No. 60/044,238, filed Apr. 24, 1997.

BACKGROUND OF THE INVENTION

The present invention relates to methods for making porous products of thermoplastic polymers and like materials by sintering the materials, and the porous products made by the methods.

Porous products of thermoplastic polymers and the like, which are commonly called porous plastics, are structures featuring interconnected (i.e. open cell) omnidirectional pores. The size of the pores typically is in the range of 5 microns to 500 microns. The structures are in a wide variety of product configurations for wicking, venting, filtering, sparging, etc. Porous plastic products include such things as nibs, catheter vents, compressed air filters, water filters, and waste water treatment diffusers.

Porous plastics are made by a form of sintering. Sintering is the process of fusing discrete particles by heat, with or without pressure, to form a porous structure. The sintering process uses raw material in the form of discrete particles of a thermoplastic polymer or the like.

A significant problem has been that some polymers are more difficult to sinter than others. It is believed that some difficult-to-sinter polymers, such as low density polyethylene and polyurethane, might have been impossible to sinter heretofore. Furthermore, polymers are primarily sold in the form of pellets, which are typically rod or cylindrical shaped nuggets of polymer ⅛ to ¼ inch in diameter. The pellets are too big to be sintered into structures with pore sizes suitable for most applications. The pellets can be ground to get raw materials of desired particle sizes, but such grinding is difficult and costly. The few plastics commercially available in flake or powder form constitute the bulk of materials used for sintering plastics.

The properties of some porous plastic products are not entirely satisfactory to perform the functions for which the products are used. For example, applicator heads of porous plastics, used on applicators for antiperspirants and deodorants in the form of fluent materials including creams, gels and the like, are somewhat abrasive. As a result, some users experience skin irritation. As another example, porous plastic is often used as a bubbler or diffuser to oxygenate water in wastewater treatment. Air is forced under pressure through the pores of a submerged hollow tube having a wall of porous plastic. The air exits the outer surface of the tube wall as bubbles that float up through the water. Oxygen diffuses into the water around each bubble. Traditional porous plastic bubblers have a broad range of pore sizes and thus emit a broad range of bubble sizes. However, the emission of large bubbles limits the efficiency of the gas transfer. Selective filtration is another example of an application where a broad pore size distribution is a limitation. Selective filtration refers to situations wherein one wishes to filter or exclude particles of a specific size but not exclude slightly smaller particles. This is difficult with a porous medium having a broad range of pore sizes.

SUMMARY OF THE INVENTION

By the present invention, the sinterability of polymers is improved by using as particles pellets smaller than typical size, that is, smaller than ⅛ inch in diameter, especially by using micropellets having a diameter of about 0.060 inch or less. In a preferred embodiment, the pellets are obtained by underwater pelletizing of the polymers. As an example of the improvement, a low density polyethylene has been found to be quite easy to sinter after underwater micropelletizing of the polyethylene.

In the underwater pelletizing process, an extrudate of a polymer moves from a die into water contacting the die, where the extrudate is cut and cooled to a solid almost instantaneously. Alternatively, the pellets may be formed by water ring pelletizing. This process is similar to the underwater pelletizing process, but water does not contact the die. Instead, the extrudate is a cut at the die face by rotating blades and immediately flung into a quenching water ring surrounding the die. In both underwater pelletizing and water ring pelletizing, the extrudate is cut at the point of extrusion. These two processes are generically called rapid water quenched pelletizing.

The dimensions of a suitable pellet along three mutually perpendicular axes, one of which can be considered to be the diameter, are generally equal to one another and, thus, these pellets are closer to spherical than particles conventionally used. Such pellets are substantially the same size and are uniform in shape, far more uniform than ground particles. As a result, the porous plastic products produced from sintering pellets are denser than porous plastic products previously produced by sintering.

Products made by sintering rapid water quenched pellets of thermoplastic polymers and the like have smoother surfaces than products made by sintering other particles of plastics. As a result, antiperspirant or deodorant applicator heads made by sintering rapid water quench pellets do not irritate the skin of users. This is due to the fact that the shape of the individual particles is more like a sphere than are the shapes of particles which have previously been sintered.

Pellets, especially micropellets and rapid water quenched pellets, which can be micropellets, form a sintered part with an exceptionally narrow range of pore sizes. This is a distinct advantage in some applications. For example, in bubblers of porous plastic made by sintering rapid water quenched micropellets, there is such a uniform pore structure that it is possible to eliminate the production of inefficient large bubbles. As another example, the porous plastic filter of sintered rapid water quenched micropellets according to the present invention has a relatively small range of pores and, thus, is well suited for excluding from liquids and gases particles of a specific size but not of a slightly smaller size in sharply selective filtration.

Additional advantages of porous plastic materials made from sintered rapid water quenched pellets, specifically micropellets, are that the material has greatly increased tensile strength compared to prior art materials, the material is substantially less susceptable to creep under stress than prior art materials, the material has greater solvent resistance than prior art materials, the material provides a greater pressure drop in fluid flowing through the material, and parts made from the material have less size variation than parts made from prior art materials.

DESCRIPTION OF THE PREFERRED EMBODIMENT

Figure 1:
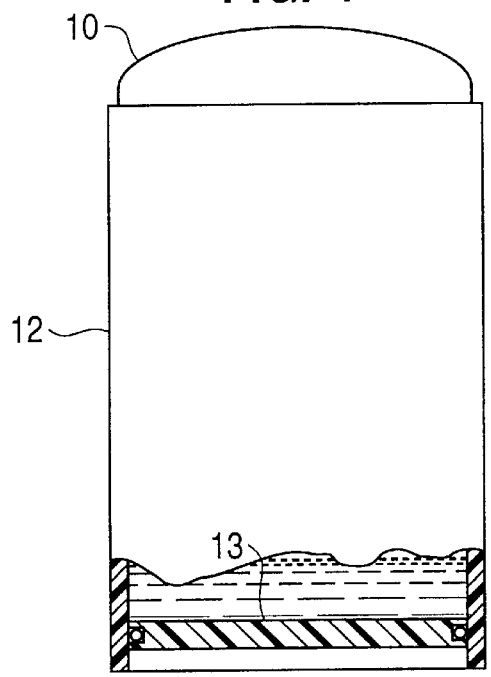
FIG. 1 is a front elevation, with a portion in cross-section, of a deodorant applicator having an applicator head made by sintering rapid water quenched micropellets of a thermoplastic polymer according to the present invention.
Figure 2:
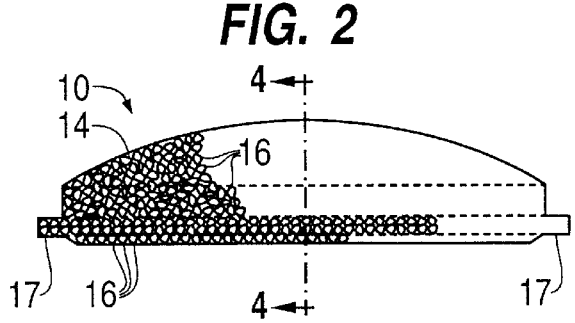
FIG. 2 is an enlarged view of the applicator head of FIG. 1.
Figure 3:
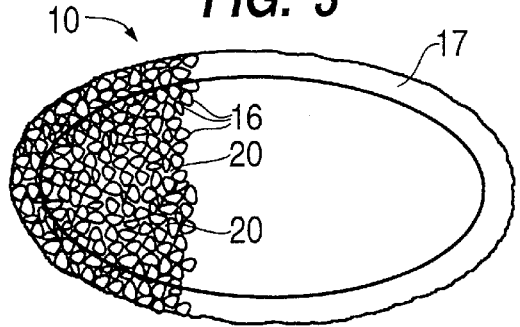
FIG. 3 is a plan view of the applicator head of FIG. 1.

According to the present invention, porous plastic products are made by sintering pellets of thermoplastic polymers and the like at greater-than-ambient temperatures, with or without greater-than-ambient pressures. The pellets are less than 1/8 inch in diameter, usually 0.060 inch in diameter or less, and/or are formed from a starting thermoplastic polymer or the like by rapid water quenched pelletizing, for example, underwater pelletizing or water ring pelletizing. In a typical apparatus for underwater pelletizing, an extruder has a horizontally mounted feed screw that turns within a heated chamber. The screw turns continuously, moving the plastic from a feed hopper through the heated chamber, where the plastic melts, and then forcing the melted plastic out through holes in a die mounted at the end of the extruder. The plastic is fully melted during the extrusion process but still has considerable viscosity. The rotating feed screw must generate enough pressure to force the molten plastic through the holes in the die.

The melted plastic, called the extrudate, exits the die in the shape of rods or strands corresponding to the size of the holes. Underwater pelletizing is often used to make micropellets, that is, pellets having a diameter of about 0.060 inches or less. As an example, micropellets 0.050 inches in diameter are made by one commercially available die having 3,900 holes, each on the order of 0.030 inches in diameter. The micropellets attain a diameter somewhat greater than the diameter of the holes due to swelling of the material. Micropellets are presently commercially available down to about 0.010 inches in diameter, and it is expected that they will soon be available in smaller sizes. The extrudate is cut to length at the die face the instant the extrudate exits the die by cutting blades moving across the face of the die. To keep the pellets from sticking to the cutter blades and to one another, the cutting blades and the die are immersed in a stream of water that flows continuously over the face of the die. As a result, the pellets are instantly solidified as they are cut, and are carried away from the die and cutter in the stream of water for later separation in a centrifugal dryer.

For the sintered porous plastic products according to the present invention, the extrudate is cut such that pellets having an axial length approximately equal to the diameter are produced. The properties of the products are optimal for most applications when the dimensions of each pellet in the products along the three mutually perpendicular axes of the pellet, one of which can be considered to be the diameter, are approximately equal to one another. In other applications, it might not be desirable for the three dimensions of each pellet to be approximately equal.

The pellets are brought together such that the outer surfaces of adjacent pellets are in contact. The spaces remaining between the pellets form the pores. The pellets are often brought together by placing them in a mold cavity of the desired shape and size. Techniques for filling a cavity with the pellets vary depending on part configuration and the dry flow properties of the pellets. Once the cavity is filled, the pellets are brought to a temperature and pressure at which the molecules at the surface of each pellet become mobile enough to mechanically intermingle with the molecules at the surface of any adjoining pellets, thus forming a bond between them. The pellets are maintained at the proper temperature and pressure until the desired degree of bonding has occurred. Thermoplastic polymers are used in connection with the present invention because they have the property of softening and fusing when heated, then hardening and becoming rigid again when cooled. After an appropriate amount of time, the mass of pellets is cooled to room temperature and removed from the cavity. The result is a porous structure molded into a specific product shape.

Pellets of some materials are so free flowing that only gravity is needed to fill a mold cavity. However, in most cases, filling is done by vibrating the cavity or the pellets, or both. An optimum thermal profile exists for most materials and products. This profile can be employed in the method according to the present invention to obtain the best results. The pellets in the mold are brought to the appropriate temperature and pressure at the appropriate rate for the desired duration, and then returned to ambient temperatures at a controlled rate. In this regard, micropellets have an advantage over larger pellets in that the duration, sometimes called cook time, is shorter, often many times shorter. As a result, the number of parts that can be produced by each mold is increased. As an example of a thermal profile suitable for the present invention, the temperature of the mold for micropellets of low density polyethylene having a diameter of 0.031 inches is raised from 85° F. or ambient temperature to 320° F. over 5 minutes and then cooled to 85° F. over 7 minutes. For pellets larger than micropellets, the profile would be the same except that the pellets would be held at 320° F. for 2 to 4 minutes.

Figure 4:
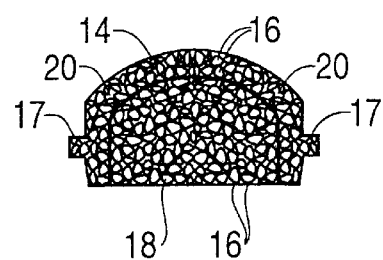
FIG. 4 is a cross-section taken along the line 4—4 in FIG. 2.

As can be seen from FIG. 1, one product according to the present invention is a porous applicator head, designated by the reference numeral 10 and secured to an applicator 12, such as an applicator for antiperspirant and/or deodorant, which can include a piston 13 or other follower arrangement to move the contents up to the applicator head. As can be seen from FIGS. 1–4, in the illustrated embodiment, an outer surface 14 of the applicator head 10, the surface which engages the skin of the user, is convex. A layer (FIG. 4) of rapid water quenched micropellets 16 precisely defines the outer surface 14 and no pellets extend outwardly beyond the outer surface. One or more other layers of the micropellets 16 lie below the layer defining the outer surface 14. The applicator head 10 can have a peripheral flange 17 for facilitating attachment to the applicator 12. As can be seen from FIG. 4, an inner surface 18 defines a large central cavity in the applicator head 10. In FIGS. 2, 3, 6 and 7, micropellets 16 are illustrated in only a portion of the product for ease of illustration, it being understood that the micropellets 16 extend in like manner throughout the entire product.

Figure 5:
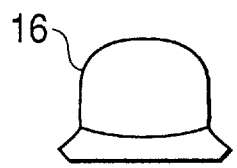
FIG. 5 is an enlarged view of a rapid water quenched micropellet used in the present invention.
Figure 6:
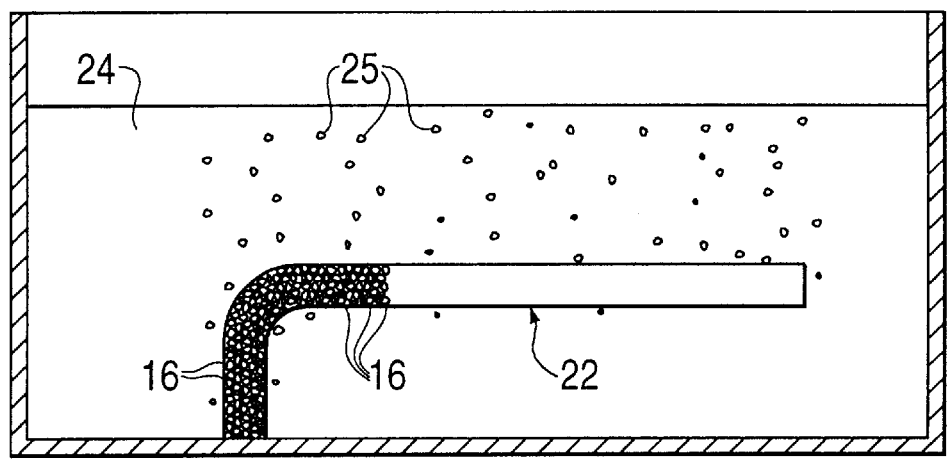
FIG. 6 is a schematic view of a bubbler of sintered rapid water quenched micropellets positioned in a container of liquid.
Figure 7:
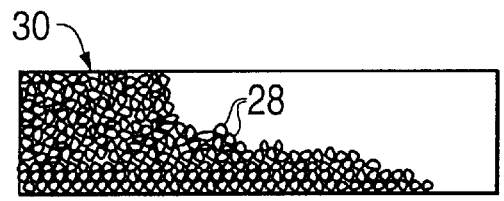
FIG. 7 is a schematic view of filter material of sintered rapid water quenched micropellets for use as a selective filter.

The rapid water quenched micropellets 16 are of low density polyethylene which are sintered together to form the porous applicator head 10. In the illustrated embodiment, the pellets 16 in the applicator head 10 are micropellets produced by underwater pelletizing, the micropellets all being of substantially the same size and are generally uniform in shape. A typical shape, a sort of gumdrop shape with an annular flange 16', is shown in FIG. 5. Deodorant in cream, gel, or other fluent material form moves through pores 20 of the applicator head 10 to the outer surface 14 thereof and into contact with the skin of the user. The outer surface 14 of the applicator head 10 is smoother than was previously possible with an applicator head of porous thermoplastic polymer or the like. Although the applicator head 10 illustrated herein is convex, the applicator head according to the present invention can have other shapes, including shapes with a major flat surface.

Although the foregoing description refers to molds, the present invention is not limited thereto since some of the porous plastic products can be formed without molds, as is done in the case of products of sheet form. Furthermore, although low density polyethylene is disclosed as an appropriate starting material, polyurethane and other materials are also suitable. Moreover, mixtures of materials, such as mixtures of plastic polymers can also be used.

Sintered rapid water quenched pellets according to the present invention can be used in the form of bubblers for use, for example, in treating wastewater. As can be seen from FIG. 6, material of sintered rapid water quenched micropellets 16 define the wall of a hollow tube 22 submerged in a pool 24 of wastewater. Air is forced under pressure, first into the space extending through the center of the hollow tube, and then through the pores in the wall of the tube 22 into the wastewater in the form of bubbles 25 that rise in the water. Oxygen diffuses into the water around each bubble. The use of pellets of uniform size, in this case micropellets 16, each having approximately equal dimensions along the three mutually perpendicular axes results in material for the tube 22 which has a narrow pore size distribution. As a result, pores which produce relatively inefficient large bubbles are avoided and more pores which produce bubbles 25 of an efficient size are formed.

The characteristic of narrow pore size distribution provides a sharply selective filter material able to filter particles of one size from a gas or liquid, while allowing particles of even only a slightly smaller size to pass. A piece of filter material formed by sintering pellets 28 of uniform size, each having approximately equal dimensions along the three mutually perpendicular axes, is indicated by the reference numeral 30 in FIG. 7. The pellets 28 have all the same characteristics as the micropellets 16 of the other products described herein, it being understood that pellets of different sizes may be chosen for different applications.

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

We claim:

1. A method manufacturing a body of porous material comprising forming pellets of thermoplastic polymer material by rapid water quenched pelletizing, and sintering said pellets into a porous material.

2. A method of making a porous material as recited in claim 1 wherein said pellets are micropellets having a maximum diameter of ⅛ inch.

3. A method of making a porous material as recited in claim 1 wherein said pellets are micropellets having a maximum diameter of 0.060 inches in diameter.

4. A method as recited in claim 1 wherein said step of rapid water quenched pelletizing is carried out to form pellets of uniform diameter.

5. A method as recited in claim 1 wherein said pellets are sintered in a mold to form a molded piece of porous material.

* * * * *